(12) United States Patent
Hammerich et al.

(10) Patent No.: US 7,461,382 B2
(45) Date of Patent: Dec. 2, 2008

(54) EVENT HANDLING WITH ACTION INSTANCES FOR EVENT-DRIVEN SOFTWARE APPLICATION

(75) Inventors: Reiner Hammerich, Rauenberg (DE); Thomas Chadzelek, Quierschied (DE)

(73) Assignee: SAP AG, Walldorf (DE)

( * ) Notice: Subject to any disclaimer, the term of this patent is extended or adjusted under 35 U.S.C. 154(b) by 905 days.

(21) Appl. No.: 10/262,570

(22) Filed: Sep. 30, 2002

(65) Prior Publication Data

US 2004/0216134 A1    Oct. 28, 2004

(51) Int. Cl.
G06F 3/00 (2006.01)
G06F 9/44 (2006.01)
G06F 9/46 (2006.01)
G06F 13/00 (2006.01)
G06F 7/00 (2006.01)
G06F 17/00 (2006.01)

(52) U.S. Cl. ................. 719/318; 715/744; 715/762; 707/100

(58) Field of Classification Search ................. 719/318, 719/328; 715/744, 762–763, 742, 760; 707/100; 714/48
See application file for complete search history.

(56) References Cited

U.S. PATENT DOCUMENTS

| | | | |
|---|---|---|---|
| 5,926,177 A | 7/1999 | Hatanaka et al. | 345/340 |
| 5,940,075 A * | 8/1999 | Mutschler et al. | 715/760 |
| 6,065,012 A * | 5/2000 | Balsara et al. | 707/102 |
| 6,463,442 B1 * | 10/2002 | Bent et al. | 707/103 R |
| 6,496,202 B1 * | 12/2002 | Prinzing | 715/762 |
| 6,571,253 B1 * | 5/2003 | Thompson et al. | 707/103 R |
| 6,601,110 B2 * | 7/2003 | Marsland | 719/310 |
| 6,757,900 B1 * | 6/2004 | Burd et al. | 719/316 |
| 6,792,607 B1 * | 9/2004 | Burd et al. | 719/316 |
| 6,810,429 B1 * | 10/2004 | Walsh et al. | 709/246 |
| 6,996,800 B2 * | 2/2006 | Lucassen et al. | 717/106 |
| 7,013,340 B1 * | 3/2006 | Burd et al. | 709/229 |

(Continued)

FOREIGN PATENT DOCUMENTS

EP    0759591 A1    2/1997

(Continued)

OTHER PUBLICATIONS

"Java 2 Platform", Aug. 2000, Sun Microsystem, Standard Edition, version 1.3.1, Class Proxy p. 1-6.*

(Continued)

*Primary Examiner*—Meng-Ai An
*Assistant Examiner*—Qing-Yuan Wu
(74) *Attorney, Agent, or Firm*—Fountainhead Law Group P.C.

(57) ABSTRACT

Methods, computer systems and apparatus, including computer program products, for handling events in an event-driven software application. An event request specifying an event and values for one or more event parameters is received in a system event handler. The system event handler identifies an action associated with the specified event. The action specifies a required set of parameters and an event handling function specifying one or more operations that can be performed on data. The system event handler generates an instance of the identified action by mapping the event parameter values to the required set of parameters. The event handling function is called in an application event handler with the generated instance of the identified action to invoke application code.

24 Claims, 5 Drawing Sheets

U.S. PATENT DOCUMENTS

| | | | |
|---|---|---|---|
| 7,076,786 B2 * | 7/2006 | Burd et al. | 719/316 |
| 2003/0160822 A1 * | 8/2003 | Belz et al. | 345/762 |
| 2003/0197726 A1 * | 10/2003 | Weitzman | 345/744 |
| 2004/0034833 A1 * | 2/2004 | Kougiouris et al. | 715/513 |
| 2004/0148375 A1 * | 7/2004 | Levett et al. | 709/223 |
| 2006/0004910 A1 * | 1/2006 | Burd et al. | 709/203 |

FOREIGN PATENT DOCUMENTS

| | | | |
|---|---|---|---|
| EP | 0798634 A1 | 10/1997 | |
| WO | WO 93/00632 | 1/1993 | |

OTHER PUBLICATIONS

"Java 2 Platform", Aug. 2000, Sun Microsystem, Standard Edition, version 1.3.1, Interface InvocationHandler p. 1-2.*

"Java 2 Platform", Dec. 2003, Sun Microsystem, Standard Edition, version 1.3.1, Class EventHandler p. 1-8.*

* cited by examiner

US 7,461,382 B2

EVENT HANDLING WITH ACTION INSTANCES FOR EVENT-DRIVEN SOFTWARE APPLICATION

BACKGROUND

The present invention relates to data processing by digital computer, and more particularly to event handling.

In the model-view-controller (MVC) design pattern used for developing software applications, the model represents the core of an application. The model can have multiple views, where each view displays information about the model to a user. A controller of the model receives events—for example, from a user through a user interface—to manipulate the model. The model and the controller typically include application code. When changes occur in the model, the model updates all of its views. Data binding is used for decoupling controller and view with regards to data flow. For example, a table view can be defined to display data of a corresponding table that is stored in the model or controller. The table is used as data source for the table view (data binding). The table view can be replaced by a different view, such as a link list, that binds against the same table. In this case the new view displays the table data without changing anything in the controller or the model. When the table view initiates an event (e.g., "onClick"), the event is processed by the controller. Typically, the controller includes an event handler that expects a specific signature (e.g., a specific list of parameters), such as "onClick(tableViewCell)", for a given event. However, when the table view is replaced by the link list view, the signature of the event is likely to change. For example, a different parameter may be passed to controller (e.g., "onClick(LinkListItem)"). Without further modification the controller may not be able to process the event that is initiated by the link list view of the event handler.

SUMMARY OF THE INVENTION

The present invention provides methods and apparatus, including computer program products, for decoupling system events from application events handling in an event-driven software application. In general, in one aspect, the invention features methods and apparatus, including computer program products, implementing techniques for event handling. The techniques include receiving an event request specifying an event and values for one or more event parameters; identifying an action associated with the specified event, the action specifying a required set of parameters and an event handling function specifying one or more operations that can be performed on data; generating an instance of the identified action by mapping the event parameter values to the required set of parameters; and calling the event handling function with the generated instance of the identified action.

The invention can be implemented to provide one or more of the following features. The event request can be a request for an event initiated in response to user input. The user input can be received in an interface defined in a view of a model-view-controller design pattern. The specified event can include information identifying one or more manipulations to be performed on data in a model associated with the view. The event handling function can specify one or more operations required to carry out the identified manipulations. The action can be defined in a controller associated with the view. The action can be associated in the view with the specified event. The controller can implement an event handler associated with the action. The event handler can include an implementation of the event handling function. The event handling function can call application code in the model or the controller. The application code can implement the specified operations.

Receiving an event request can include receiving an event request in a first event handler and extracting a representation of the event from the request. The techniques can include determining whether the generated instance of the identified action is a valid instance of the identified action. The event handling function can be called only if the generated instance of the identified action is determined to be valid. The techniques can include determining whether the specified action is enabled. The event handling function can be called only if the action is determined to be enabled. The specified action can include an enabled attribute having a value indicating whether the action is enabled or disabled. Determining whether the specified action is enabled can include accessing the value for the enabled attribute.

In general, in another aspect, the invention features a computer system for event handling. The system includes a system event handler operable to perform an analysis to determine whether a system event received by the system event handler triggers an application event; and an application event handler operable to call application code if the application event is triggered and invokes the application event handler.

The invention can be implemented to provide one or more of the following features. The system event handler, when performing the analysis, can determine whether the system event includes a valid representation of an action associated with the application event. The system event handler, when performing the analysis, can determine whether the action is enabled. The action can be defined in a controller of a model. The controller can implement an application event handler associated with the action. The application event handler can implement an event handling function to call the application code. The system can include a phase handler operable to control a plurality of phases of the computer system. The plurality of phases can include a request handling phase, a system event handling phase, a data validation and transport phase and an application event handling phase. The phase handler can receive a request in the request handling phase. The phase handler can extract the system event from the request. After extracting the system event from the request, the phase handler can start the system event handling phase. After receiving a valid representation of an action, the phase handler can start the data validation and transport phase. The phase handler can call validation services during the data validation and transport phase to convert non-typed values of the request into typed values and to validate the typed values. The phase handler can start the application event handling phase after successful completion of the data validation and transport phase by initiating the application event associated with the action.

In general, in another aspect, the invention features a computer system for event handling. The system includes a model; a view operable to present the model and initiate a system event, the view being further operable to associate the system event with an action; and a controller operable to manipulate the model in response to the system event, the controller being operable to provide the action and to call application code through an event handling function associated with the action.

The invention can be implemented to provide one or more of the following features. The system event can be received by a system event handler that returns a representation of the action to a framework. In response to receiving the representation of the action, the framework can invoke an application event handler that implements the event handling function.

In general, in still another aspect, the invention features methods and apparatus, including computer program products, implementing event handling techniques. The techniques include providing a model, a view operable to present the model and initiate a system event, and a controller operable to manipulate the model in response to the system event; providing an action in the controller; associating the system event with the action; and calling application code through an event handling function associated with the action to manipulate the model in response to the system event.

In general, in another aspect, the invention features methods and apparatus, including computer program products, implementing event handling techniques. The techniques include performing an analysis of a system event in a system event handler to determine whether the system event triggers an application event; initiating the application event in response to the analysis of the system event; and processing the application event by an application event handler to call application code.

The invention can be implemented to provide one or more of the following features. The techniques can include receiving a request in a phase handler, and extracting the system event from the request. The techniques can include returning from the system event handler to the phase handler a valid representation of an action associated with the system event. The application event can be associated with the action. The phase handler can initiate the application event if the action is enabled.

The invention can be implemented to realize one or more of the following advantages. Decoupling system events from the corresponding application events by using event binding separates the system event handling level from the application event handling level. The system event handler need not implement application logic for event handling, but simply invokes the corresponding application event handler. This allows an application developer (or user) to replace views in an extended MVC design pattern without modifying the corresponding controller or model.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
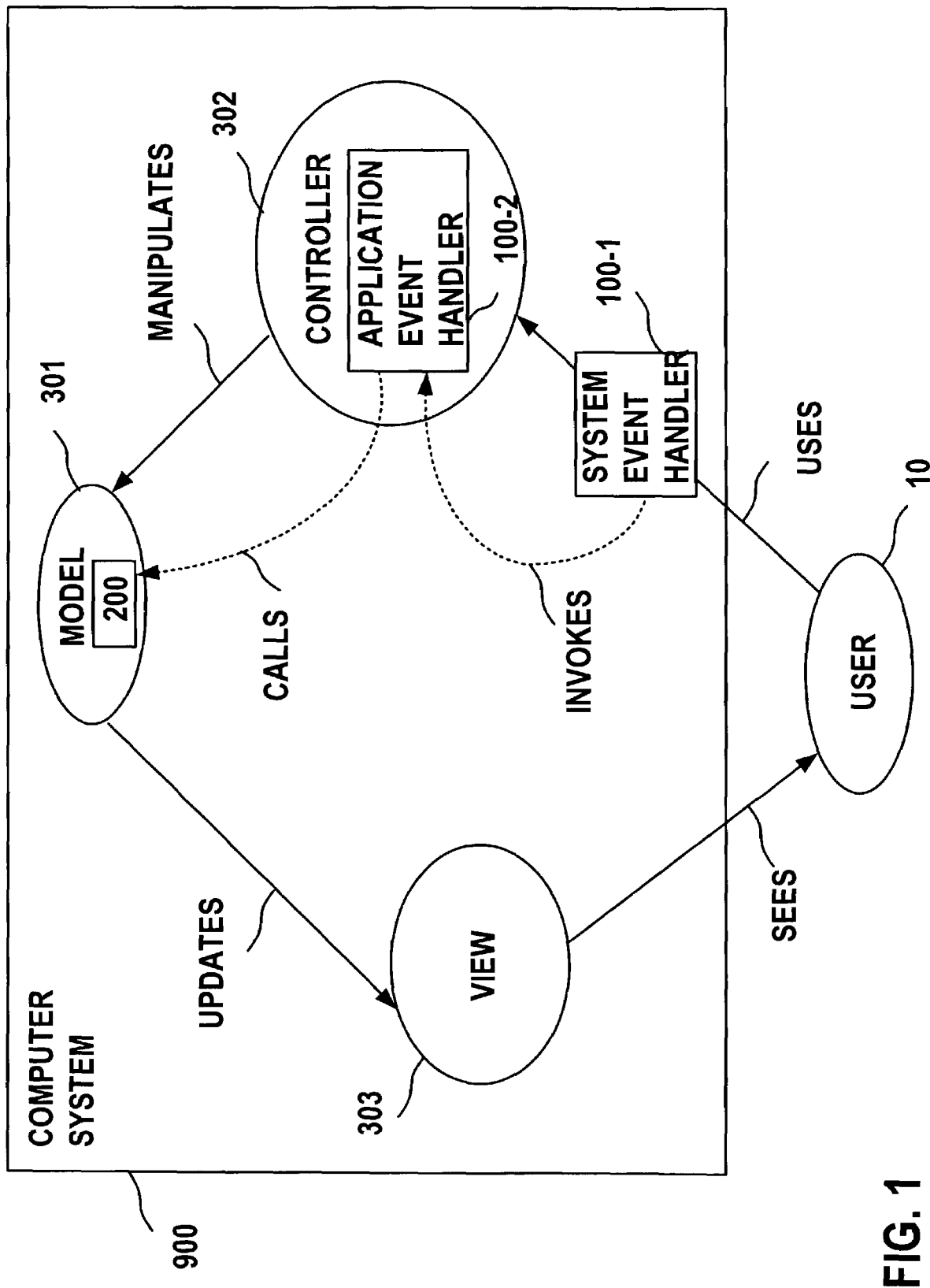
FIG. 1 is a diagram of an extended model-view-controller design pattern according to one implementation of the present invention.

As shown in FIG. 1, an exemplary computer system 900 in accordance with the invention stores a model 301, a view 303 of the model 301, and a corresponding controller 302. The model 301 and the controller 302 can include application code 200 that defines an application. The view 303 presents data of the model 301 and/or controller 302 to the user. The model 301 can have multiple views that can be represented to the user as different presentations of the application (model 301/controller 302). When the user interacts with the computer system 900 through a graphical user interface that includes a presentation of the model 301/controller 302, the user 10 uses the controller 302 to manipulate the model 301, which updates its views (e.g., view 303) to reflect the results of the user's actions.

The computer system 900 includes a system event handler 100-1 to receive and process system events that result, for example, from user interactions. The system event handler 100-1 can be implemented as a method of a specific controller class. For example, if the user 10 selects a specific user interface (UI) element, such as an OK button, displayed in one of the views of the model 301, and if selection of the UI element initiates a system event (e.g., "onClick"), the system event handler 100-1 receives the system event. Additional examples of UI elements include links, menu items, toolbars or leaves of a tree. Additional examples of system events include scroll events or help request events. Not every system event triggers an application event. For example, system events that are initiated by scrolling a table can be handled by the system event handler 100-1 without an application.

After the system event handler 100-1 receives a system event, it analyzes the system event to determine whether the system event triggers an application event, and provides the analysis result to a framework in the computer system 900. Examples of application events include "CheckAvailibility", "CheckValidBusinessPartner" and "SaveOrder". If the system event handler determines that the system event triggers an application event, the framework invokes a corresponding application event handler 100-2 by initiating an application event that corresponds to the system event. In one implementation, the application event handler 100-2 is a method that is implemented in the controller 302. In other implementations, the application event handler 100-2 can be located in any controller. The application event handler 100-2 calls application code 200 that is associated with the application event and that is implemented by the model 301 (as shown in the example of FIG. 1) or the controller 302.

Thus, the system event (e.g. "onClick") that is initiated by a particular UI element is decoupled from the corresponding application event (e.g., "SaveOrder"). In other words, the system event handler 100-1 does not need to implement application logic for event handling, but simply invokes the corresponding application event handler 100-2.

Figure 2:
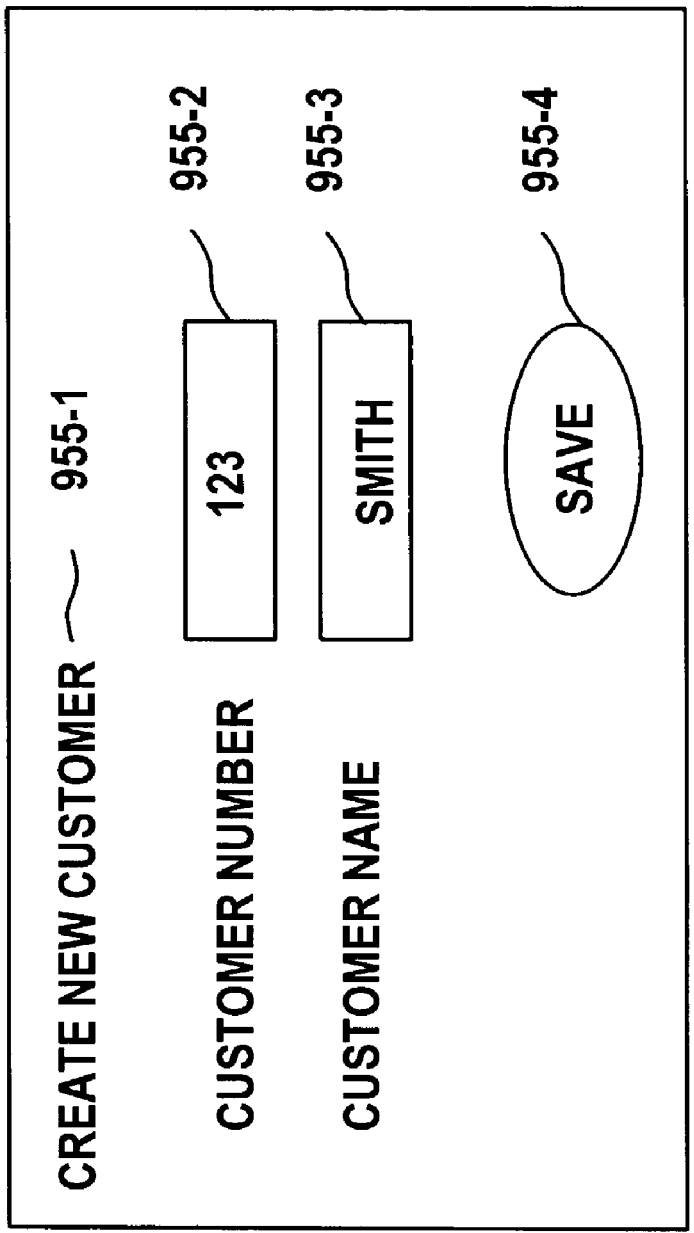
FIG. 2 illustrates one example of a visualization of a view suitable for use in the extended model-view-controller design pattern of FIG. 1.

FIG. 2 illustrates one example of a visualization of a view 303 that is presented to the user 10 as a graphical user interface (GUI) 955 of an application. In this example, the user is a sales person of a specific sales organization SO1, and uses the GUI 955 to create new customers in a customer relationship management (CRM) system of the sales organization SO1. GUI 955 includes four UI elements: a title 955-1 (CREATE NEW CUSTOMER) for displaying the title of the application; a first input field 955-2 (CUSTOMER NUMBER) for entering a customer number; a second input field 955-3 (CUSTOMER NAME) for entering a customer name; and a SAVE button 955-4 for saving the values of the input fields (e.g., in a corresponding portion of a database). In the example shown in FIG. 2, the user has entered CUSTOMER NUMBER "123" and CUSTOMER NAME "SMITH", and sends a corresponding request to the computer system 900 by selecting the SAVE button.

Figure 3:
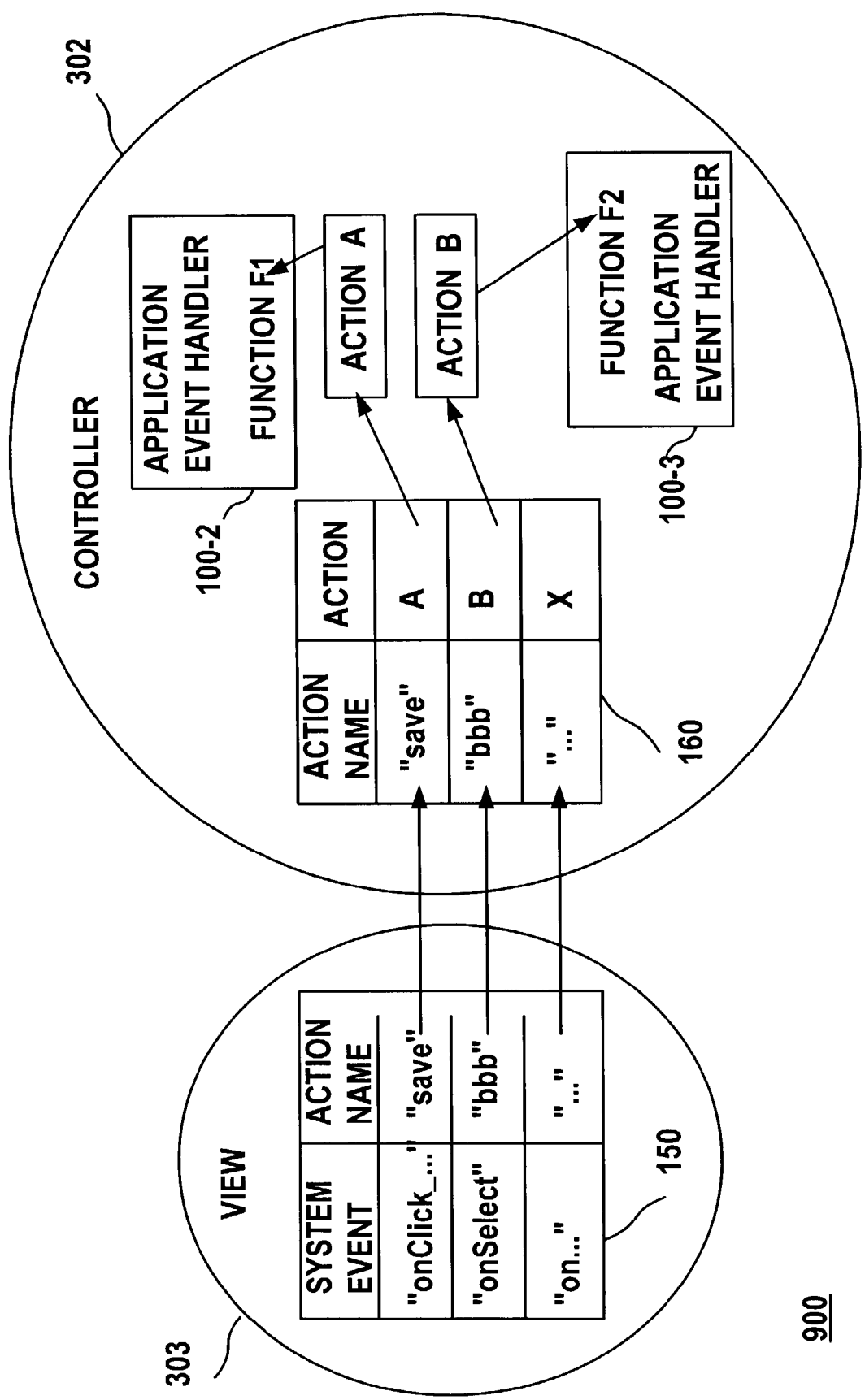
FIG. 3 illustrates a mapping scheme for decoupling system events and application events by using mapping tables for event binding according to one implementation of the present invention.

FIG. 3 illustrates a mapping scheme for handling events initiated in view 303 illustrated in FIG. 2. The controller 302 defines actions (e.g., ACTION A, ACTION B) that implement application events. A system event (e.g., "onClick", "onSelect") that can be initiated by a UI element of the view 303 and that triggers an application event is associated with a corresponding action of the controller.

Actions can have one or more attributes, such as "enabled" to indicate if the action is enabled, "text" to define a text of the action to be displayed by the view, and "function" to reference an event handling function (e.g., F1, F2) that is implemented in a corresponding application event handler. Each action A, B that is defined in the controller 302 is associated with a corresponding application event handler 100-2, 100-3, respectively, that implements an associated event handling function F1, F2. Actions also include information about the signature of (e.g., parameters required by) the associated event handling function. Table 1 illustrates a simplified example of a declaration of action A (FIG. 2) in the controller 302.

TABLE 1

```
<Controller>
    ...
    <Action
        name="save"
        enabled = "true"
        Text = "SAVE"
        Tooltip = "This action saves a new customer">
        <parameters>
            <parameter name="SALESORG" type="ddict.sorg"/>
            <parameter name="CUSTNR" type="ddict.custnr"/>
            <parameter name="CUSTNAME" type="ddict.custna"/>
        </parameters>
    </Action>
    ...
</Controller>
```

An action can be instantiated from a corresponding action class of the controller 302. The "enabled" attribute can be set by an application developer at design time when building the application. The declaration of an action can also include further attributes, such as sound attributes, that can be used as additional guidance for disabled users for navigating in the GUI.

In one implementation, the view 303 has an associated event-action table 150. The event-action table 150 includes a SYSTEM EVENT column to list system events that can be initiated by specific UI elements of the view 303, such as the SAVE button (e.g., "onClick_Button_SAVE"). The ACTION NAME column specifies an action name (e.g., "save", "bbb") for the action to which each system event that triggers an application event is assigned. The event-action table 150 can include further columns to reflect the signature of (e.g., parameters required by) an action. For example, an action A for saving a new customer can have parameters such as the customer number, the customer name, and the sales organization serving the new customer. The view 303 also defines the mapping of system event parameters to parameters of the corresponding action. Each system event is unique in the event-action table 150 with regards to the view 303.

A row of the event-action table 150 that specifies an action name for a system event is mapped to a corresponding row in an action table 160 of the controller. The mappings are illustrated by arrows pointing from rows of the event-action table 150 to the action table 160. The ACTION NAME column of the action table 160 includes the action names (e.g., "save", "bbb") of the actions that are defined by the controller 302. In the example, tables 150, 160 are mapped according to the action name. Alternatively, other information can be used for the mapping. The mapping can also be defined dynamically through program code that is evaluated at runtime. The ACTION column of the action table 160 includes a reference to an action (e.g., A, B). The references (both from the action table 160 to the corresponding action, and from the action to its associated event handling function) are illustrated by arrows from the rows of the action table to the corresponding action and further to the event handling functions in the associated application event handlers.

Because system events are bound to actions—that is, because view's system events (and their parameters) are mapped to the controller's actions (and their parameters)—a view 303 can be replaced with another view of the model without requiring modification of the controller 302 and still result in a working eventing model. The controller 302 defines the actions that can be used by views of the model 301, and each view maps its system events to these actions. To ensure unambiguous mapping rules, the name of each action is unique within the scope of a controller. The mapping functions of the event-action table 150 and the action table 160 can be implemented by alternative means, such as structured documents (e.g., XML documents) or equivalent data structures with appropriate pointers.

Figure 4:
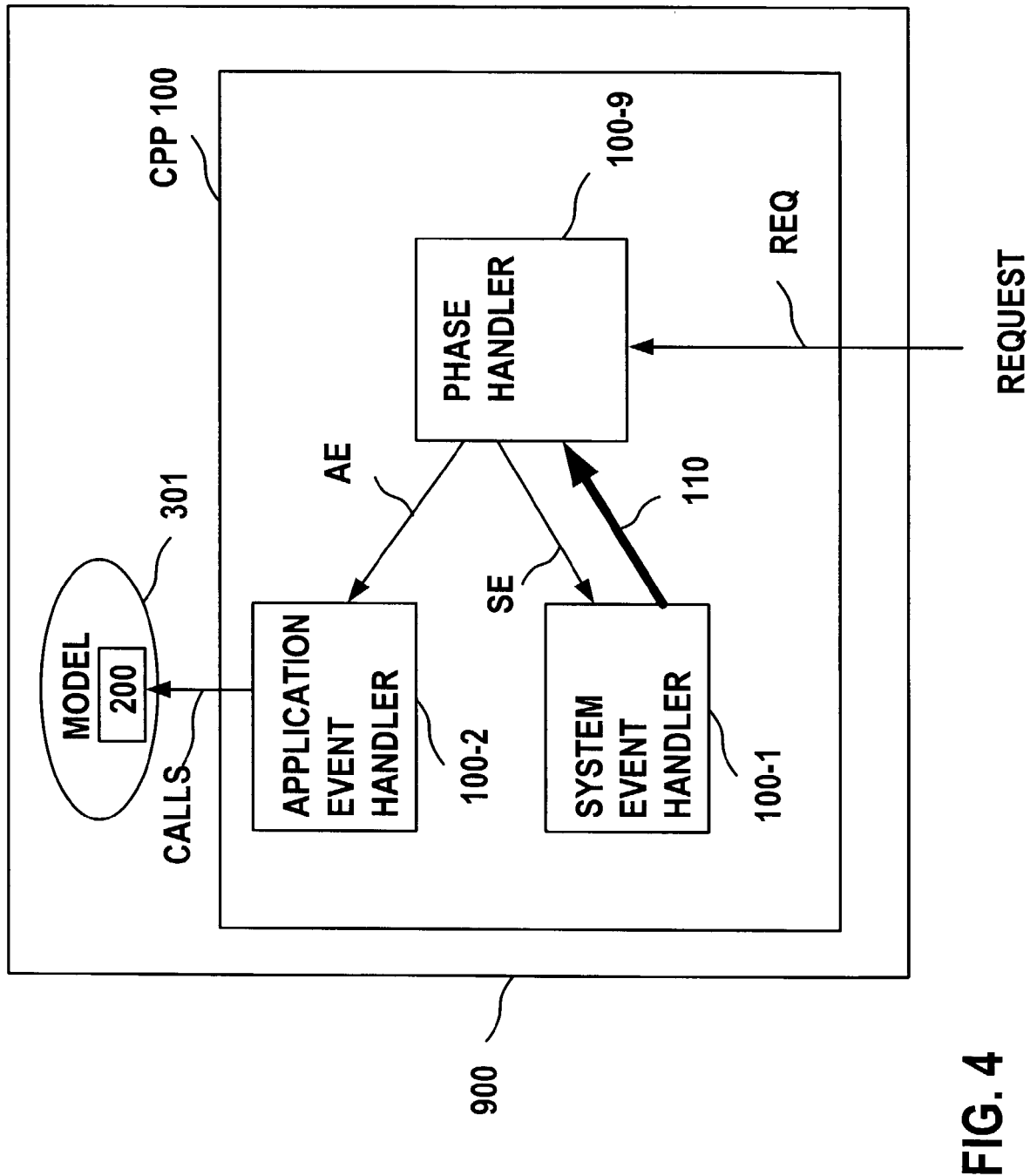
FIG. 4 is a diagram illustrating a computer program product including a system event handler and an application event handler according to one implementation of the present invention.

FIG. 4 illustrates one implementation of a computer program product (CPP) 100 running on the computer system 900 and including the system event handler 100-1 and the application event handler 100-2. CPP 100 includes a phase handler 100-9 to chronologically control a plurality of phases of the computer system 900, including a request handling phase, a system event handling phase, a data validation and transport phase and an application event handling phase. The phase handler 100-9 can be implemented as a part of the framework.

When the user interacts with the computer system and generates a request REQ, for example, by using a client computer that presents the view 303 to the user (e.g., through GUI 955), the phase handler 100-9 receives the request in the request handling phase. The request can also originate from a second computer system that communicates with the computer system over a network, such as a local area network (LAN), a wide area network (WAN) or the Internet. The view 303 can be presented to the user on an output device (e.g., a monitor) of the client computer. The phase handler 100-9 then extracts the system event SE from the request REQ.

The phase handler 100-9 starts the system event handling phase and sends the system event SE to the system event handler 100-1. The system event handler 100-1 performs an analysis to determine if the system event SE triggers an application event AE. For example, the system event handler 100-1 determines whether the system event SE is associated with (e.g., assigned to) a corresponding action and, if so, determines with which action (e.g., action A) it is associated. The system event handler 100-1 can also determine if the action A is enabled (e.g., by verifying a corresponding "enabled" attribute from the declaration of the action A in the controller 302). The system event handler 100-1 then returns the result 110 of the analysis to the phase handler 100-9. The result 110 includes the representation of the action A, and can also include, for example, the value of the "enabled" attribute. If the value of the "enabled" attribute indicates that the action A is disabled, the phase handler 100-9 can respond to the request REQ with a corresponding message. Otherwise, once the phase handler 100-9 receives the valid representation of the action A, it starts the data validation and transport phase.

During the validation the phase handler can call validation services of the framework to convert non-typed data (e.g., raw string representation of data) of the original request REQ into typed data and to validate the typed data according to pre-defined validation rules. The predefined validation rules can be stored in a memory portion of the computer system 900, for example, in the form of a data dictionary or a rule data base. During the data transfer, data of the view 303 can be transported to the model 301 or the controller 302 depending on predefined data binding rules.

If any error occurs during the data validation and transport phase, the phase handler 100-9 can respond to the original request REQ by, for example, posting an error message or prompting the user to correct a corresponding user input. Referring back to the example of FIG. 2, if the user enters a customer number 999 and the range of customer numbers for the sales organization SO1 is limited to the range from 001 to 300, then a validation service checking the validity of the customer number can generate an error message and the phase handler 100-9 can prompt the user to re-enter the customer number in GUI 955. If the data validation and transport phase is successfully completed, the phase handler 100-9 starts the application event handling phase.

The application event AE is constructed from data of the system event SE, the corresponding action (including its signature), and the mapping of system event parameters to action parameters. The application event AE includes typed data instead of the originally non-typed data of the system event SE and, in general, has a different signature. The appropriate application event handler 100-2 is identified through the action A corresponding to the application event AE. The application event handler 100-2 then calls (CALLS) application code 200 by processing the event handling function F1 (cf. FIG. 2) that is implemented in the application event handler 100-2. The application code 200 can be implemented within the model 301, as it is in the example of FIG. 4, or within the controller 302. In the latter case, the application event handler 100-2 calls the application code of the controller 302 instead of the model 301.

Figure 5:
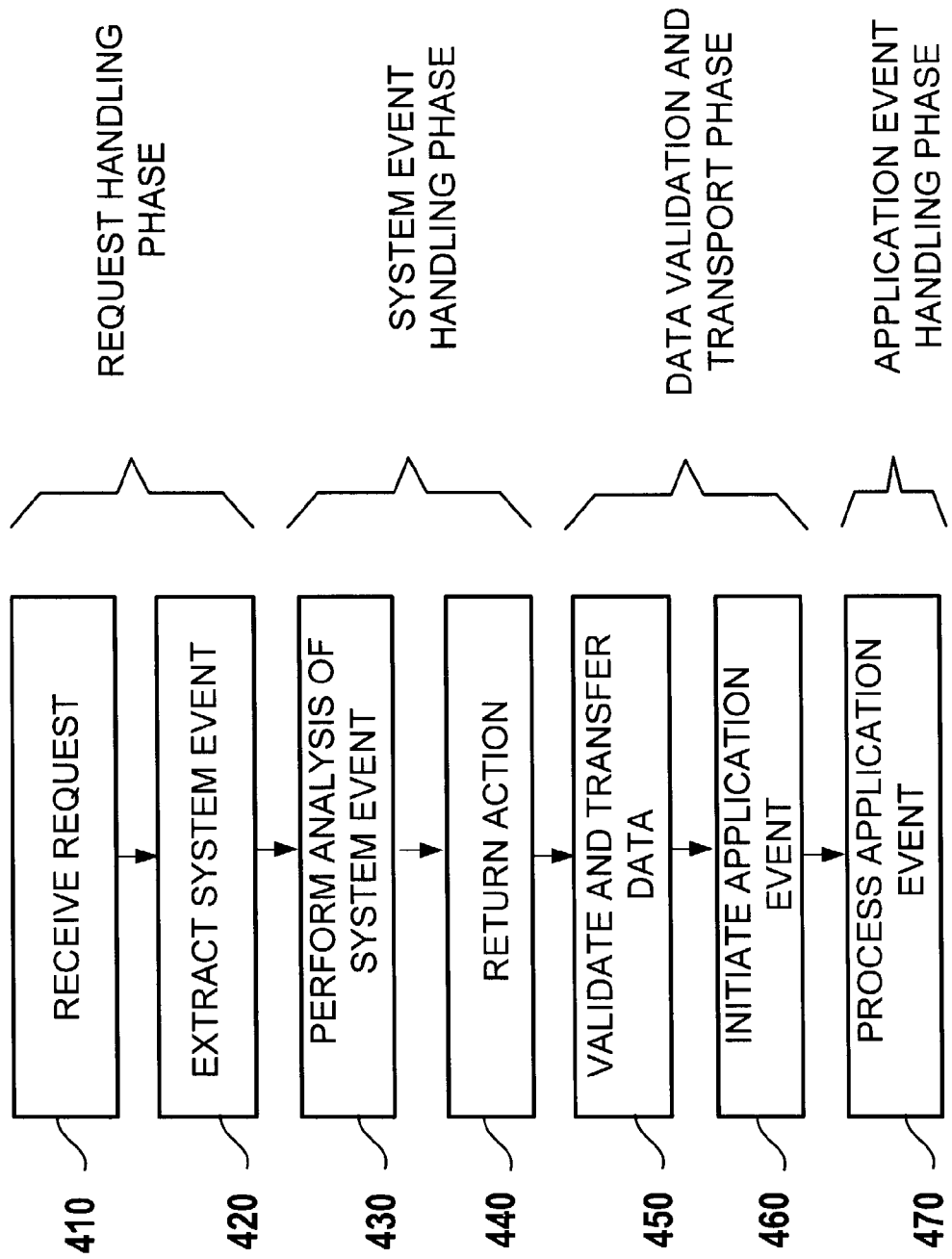
FIG. 5 is a flow diagram illustrating a method for event handling according to one implementation of the present invention.

FIG. 5 illustrates a method 400 that can be used to implement event handling in an extended MVC design pattern. The method begins when the computer system 900 receives a request REQ (step 410) that can, for example, result from a user interaction or that can be raised by a further computer system. Referring to the example of FIG. 2, if the request REQ results from the user interaction with SAVE button 955-4 of the view 303, the request REQ can include the following data in a string format:

"onClick_Button_SAVE", "CUSTOMER NUMBER"="123", "CUSTOMER NAME"="SMITH".

The phase handler 100-9 extracts the system event (e.g., "onClick_Button_SAVE") from the request (step 420). The phase handler 100-9 can extract the system event from the request using conventions defined by a communication protocol, such as the hypertext transfer protocol (HTTP). The phase handler 100-9 sends the system event to the system event handler 100-1. In one implementation, steps 410 and 420 are performed during the request handling phase, described above.

The system event handler 100-1 analyzes the system event to determine whether the system event (e.g., "onClick_Button_SAVE") includes a valid representation of an action (step 430). For example, in the example of FIGS. 2-3, the system event handler 100-1 accesses the event-action table 150 and finds the action name "save" assigned to the system event "onClick_Button_SAVE". The system event handler 100-1 retrieves from the view 303 information describing how parameters of the system event map to corresponding parameters of the action. The system event handler 100-1 can retrieve from the controller 102 information about the action's signature (e.g., parameters that the particular action requires). Thus, for example, the system event handler 100-1 learns from the controller 302 that action A, referenced by action name "save", requires the parameters SALESORG, CUSTNR and CUSTNAME. The system event handler 100-1 can also learn from the controller 302 whether the identified action has an "enabled" attribute and read the value (e.g., "true" or "false") of this attribute. A simplified example of one implementation of a system event handler 100-1 is illustrated in Table 2.

TABLE 2

```
SystemEventHandler__100-1 (SystemEvent event)
{
    view = framework.getCurrentView( )
    action = view.getAction(event.name);
    for each parameter in action.parameters
    {
        paramter.value = view.MapEventParam(event);
        action.setParameter(parameter);
    }
    return action;
}
```

The view 303 can define the parameter mapping in the event-action table 150 or an equivalent mapping data structure. For example, in the example of FIG. 2, the view input field CUSTOMER NUMBER can be mapped to the action parameter CUSTNR, and the view input field CUSTOMER NAME can be mapped to the action parameter CUSTNAME. The parameter SALES ORGANIZATION can be stored in the view 303 as a constant value SO1 if the view 303 is intended for use only by sales people of sales organization SO1. In that case, the mapping simply assigns the constant value SO1 to the action parameter SALESORG. Referring to Table 2 in the context of the example of FIGS. 2-3, event.name equals "onClick_Button_SAVE"; action.parameters is a collection of the parameters of the action A ("save"), including CUSTNR, CUSTNAME, and SALESORG. For each parameter of the action A, the parameter value is set by the view 303 to the values entered in the view input fields CUSTOMER NUMBER, CUSTOMER NAME and to the constant value "SO1", respectively.

In one implementation, a UI element of a view can be generated at runtime. In such implementations, an action can be dynamically assigned to the UI element. Table 3 illustrates an example of a function OnOutputProcessing that can be used to assign an action "set_options" to a button "OPTIONS" that is generated at runtime.

TABLE 3

```
void OnOutputProcessing( )
{
    Button button = createButton("OPTIONS");
    Action action = createAction(
                    Name = "set_options",
                    enabled = true,
                    text = "Set options",
                    EventHandler = someMethod);
    button.setAction(action);
    ...
}
...
```

TABLE 3-continued

```
Eventhandler someMethod( )
{
    ... Code for implementation of "set_options" goes here
}
```

If the system event handler determines that the system event includes a representation of a valid action A for the system event, the system event handler returns the identified valid action A to the phase handler 100-9 as part of the result 110 of the analysis (step 440). The returned result can also include information about the action's signature, and the parameter mapping information. Steps 430 and 440 can be performed during the system event handling phase, described above. The result 110 can also include the value of the "enabled" attribute of the action A. In one implementation, the start of the data validation and transport phase can further depend on the value of the "enabled" attribute. If the action A is disabled, the phase handler 100-9 can send a corresponding response to the user. Otherwise, the data validation and transport phase is started.

The phase handler validates the data and transfers the validated data from the view 303 to the model 301 or the controller 302 (step 450). To validate the data, the phase handler calls validation services that transform non-typed (string) values of the original request REQ into typed values. For example, "CUSTOMER NUMBER"="123" is transformed into CUSTNR=123, where CUSTNR has a type integer (3). The validation services can then validate the typed values against predefined validation rules. For example, a validation rule can indicate that users of the sales organization S01 are only allowed to create customer numbers in the range from 001 to 300. If this condition is not fulfilled, the phase handler can send a corresponding response (e.g., error message) to the user. Once the typed values are validated (e.g., no errors occurred during the validation), the data are transferred from the view 303 to the corresponding data sources (e.g., a database table) of the model 301 or the controller 302.

The phase handler 100-9 next initiates an application event (step 460). The phase handler 100-9 uses the information about the action A, its signature, attributes and the typed values to construct the application event that invokes the application event handler 100-2 that corresponds to the action A. In one implementation, steps 450 and 460 are performed during the data validation and transport phase, described above.

The application event handler 100-2 processes the application event (step 470). For example, if the action information in the application event includes a reference to the corresponding event handling function F1 (e.g., F1="save_new_customer"), the application event handler 100-2 process the application event by executing the event handling function F1 that is referenced in the application event. The event handling function F1 implements application specific code that, when executed, calls the application code 200 (e.g., of the model 301) in response to the application event. A simplified example of one implementation of an application event handler 100-2 in the context of the example of FIG. 2 is described in Table 4.

TABLE 4

```
void save_new_customer(CustomNr type CUSTNR,
        CustomName type CUSTNAME,
        SalesOrg type SALESORG)
```

TABLE 4-continued

```
{
    newCustomer = createInitalCustomer(CustomNr,
        CustomName,
        SalesOrg);
    DataBase.OpenConnection( );
    DataBase.InsertRecord( newCustomer );
    DataBase.CommitAndClose( );
}
```

In the example of Table 4, the application specific coding that corresponds to event handling function F1 includes instructions to access an application database (DataBase) and to store a record for the new customer in the application database. Step 470 can be performed during the application event handling phase, discussed above.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

Although the invention is described in the context of a user interacting with a graphical user interface, the described methods, computer programs and systems can also be implemented to enable interaction with other user interfaces, such as voice driven user interfaces. In a voice driven user interface, for example, the view can include UI elements defined by specific sounds or words, which can be useful for users that are blind or have other disabilities.

The methods and computer program products are described in the context of pseudo code examples using an XML-like notation. However, corresponding code can be implemented in any appropriate programming language, such as Java or C++.

It can be convenient for applications to share standard actions such as "save", "mail to" or "print" to reuse the same action definition multiple times. Such standard actions can be created and stored in a public or private repository, such that an application programmer can easily reuse an action and bind the action to any UI element in any view. A controller definition can provide for the use of a standard action by, for example, defining a value for a specific repository attribute.

What is claimed is:

1. A computer-implemented method, comprising:
receiving a user input request initiated in response to a user input received in an interface defined in a view of a model-view-controller;
extracting from the user input request a system event specified by the user input request and values for one or more system event parameters;
receiving, by a system event handler, the system event and the values for the one or more system event parameters;
identifying an action that implements an application event triggered by the system event, the action specifying a required set of parameters and an event handling function specifying one or more operations that can be performed;
generating an instance of the identified action by mapping the one or more system event parameter values to the required set of parameters; and
calling the event handling function with the generated instance of the identified action, the event handling function being implemented in a corresponding application event handler to perform the specified one or more operations,
wherein the system event includes information identifying one or more manipulations to be performed on data in a model associated with the view, and wherein the event handling function specifies one or more operations required to carry out the identified manipulations.

2. The method of claim 1, wherein:
the action is defined in a controller associated with the view.

3. The method of claim 2, wherein:
the action is associated in the view with the system event.

4. The method of claim 2, wherein:
the controller implements the application event handler that implements the event handling function called by the instance of the identified action.

5. The method of claim 2, wherein:
the event handling function calls application code in the model or the controller, the application code implementing the specified operations.

6. The method of claim 1, further comprising:
determining whether the generated instance of the identified action is a valid instance of the identified action; and
wherein calling the event handling function includes calling the event handling function only if the generated instance of the identified action is determined to be valid.

7. The method of claim 1, further comprising:
determining whether the identified action is enabled;
and wherein calling the event handling function includes calling the event handling function only if the action is determined to be enabled.

8. The method of claim 7, wherein:
the identified action includes an enabled attribute having a value indicating whether the action is enabled or disabled; and
determining whether the specified action is enabled includes accessing the value for the enabled attribute.

9. A computer program product, tangibly embodied in a machine-readable storage device, for handling events, the computer program product being operable to cause data processing apparatus to:
receive a user input request initiated in response to a user input received in an interface defined in a view of a model-view-controller;
extract from the user input request a system event specified by the user input request and values for one or more system event parameters;
receive, by a system event handler, the system event and the values for the one or more system event parameters;
identify an action that implements an application event triggered by the system event, the action specifying a required set of parameters and an event handling function specifying one or more operations that can be performed;
generate an instance of the identified action by mapping the one or more system event parameter values to the required set of parameters; and
call the event handling function with the generated instance of the identified action, the event handling function being implemented in a corresponding application event handler to perform the specified one or more operations, wherein the system event includes information identifying one or more manipulations to be performed on data in a model associated with the view, and wherein the event handling function specifies one or more operations required to carry out the identified manipulations.

10. The computer program product of claim 9, wherein:
the action is defined in a controller associated with the view.

11. The computer program product of claim 10, wherein:
the action is associated in the view with the system event.

12. The computer program product of claim 10, wherein:
the controller implements the application event handler that implements the event handling function called by the instance of the identified action.

13. The computer program product of claim 10, wherein:
the event handling function calls application code in the model or the controller, the application code implementing the specified operations.

14. The computer program product of claim 9, the product being further operable to cause data processing apparatus to:
determine whether the generated instance of the identified action is a valid instance of the identified action;
wherein the event handling function is called only if the generated instance of the identified action is determined to be valid.

15. The computer program product of claim 9, the product being further operable to cause data processing apparatus to:
determine whether the identified action is enabled;
wherein the event handling function is called only if the action is determined to be enabled.

16. The computer program product of claim 15, wherein:
the identified action includes an enabled attribute having a value indicating whether the action is enabled or disabled; and
the product is operable to cause data processing apparatus to determine whether the specified action is enabled by accessing the value for the enabled attribute.

17. A computer system comprising:
one or more digital processors for processing a model-view-controller computer program, wherein the model-view-controller computer program:
receives a user input request initiated in response to a user input received in an interface defined in a view of the model-view-controller;
extracts from the user input request a system event specified by the user input request and values for one or more system event parameters;
receives, by a system event handler, the system event and the values for the one or more system event parameters;
identifies an action that implements an application event triggered by the system event, the action specifying a required set of parameters and an event handling function specifying one or more operations that can be performed;
generates an instance of the identified action by mapping the one or more system event parameter values to the required set of parameters; and
calls the event handling function with the generated instance of the identified action, the event handling function being implemented in a corresponding application event handler to perform the specified one or more operations, wherein the system event includes information identifying one or more manipulations to be performed on data in a model associated with the view, and wherein the event handling function specifies one or more operations required to carry out the identified manipulations.

18. The computer system of claim 17, wherein:
the action is associated in the view with the system event.

19. The computer system of claim 17, wherein:
the action is defined in a controller associated with the view.

20. The computer system of claim 19, wherein:
the controller implements the application event handler that implements the event handling function called by the instance of the identified action.

21. The computer system of claim 19, wherein:
the event handling function calls application code in the model or the controller, the application code implementing the specified operations.

22. The computer system of claim 17, wherein the software further:
determines whether the generated instance of the identified action is a valid instance of the identified action; and
wherein calling the event handling function includes calling the event handling function only if the generated instance of the identified action is determined to be valid.

23. The computer system of claim 17, wherein the software further:
determines whether the identified action is enabled;
and wherein calling the event handling function includes calling the event handling function only if the action is determined to be enabled.

24. The computer system of claim 17, wherein:
the identified action includes an enabled attribute having a value indicating whether the action is enabled or disabled; and
determining whether the specified action is enabled includes accessing the value for the enabled attribute.

* * * * *